(12) United States Patent
Zhao et al.

(10) Patent No.: US 10,524,302 B2
(45) Date of Patent: Dec. 31, 2019

(54) WIRELESS COMMUNICATION METHOD AND WIRELESS COMMUNICATION DEVICE

(71) Applicant: Sony Corporation, Tokyo (JP)

(72) Inventors: Youping Zhao, Beijing (CN); Yiteng Wang, Beijing (CN); Xin Guo, Beijing (CN); Chen Sun, Beijing (CN)

(73) Assignee: SONY CORPORATION, Tokyo (JP)

(*) Notice: Subject to any disclaimer, the term of this patent is extended or adjusted under 35 U.S.C. 154(b) by 274 days.

(21) Appl. No.: 15/469,838

(22) Filed: Mar. 27, 2017

(65) Prior Publication Data

US 2017/0303333 A1 Oct. 19, 2017

(30) Foreign Application Priority Data

Apr. 15, 2016 (CN) .......................... 2016 1 0236770

(51) Int. Cl.
| | |
|---|---|
| *H04W 4/02* | (2018.01) |
| *H04W 28/02* | (2009.01) |
| *H04W 36/00* | (2009.01) |
| *H04W 72/04* | (2009.01) |
| *H04L 5/00* | (2006.01) |
| *H04W 64/00* | (2009.01) |
| *H04W 76/19* | (2018.01) |
| *H04W 4/029* | (2018.01) |
| *H04W 36/32* | (2009.01) |

(52) U.S. Cl.
CPC .......... *H04W 76/19* (2018.02); *H04W 4/023* (2013.01); *H04W 4/025* (2013.01); *H04W 4/029* (2018.02); *H04W 28/0226* (2013.01); *H04W 36/0011* (2013.01); *H04W 36/32* (2013.01)

(58) Field of Classification Search
CPC ... H04W 76/19; H04W 72/048; H04W 4/029; H04W 4/023; H04W 4/025; H04W 28/0226; H04W 36/0011; H04W 36/32; H04W 4/02; H04W 16/14; H04W 24/10; H04W 48/04; H04W 64/003; H04L 5/0069; H04L 5/0062; H04L 5/0073
See application file for complete search history.

(56) References Cited

U.S. PATENT DOCUMENTS

| | | | | |
|---|---|---|---|---|
| 2009/0196245 | A1* | 8/2009 | Ji | H04L 1/0025 370/329 |
| 2015/0373554 | A1* | 12/2015 | Freda | H04W 16/14 455/450 |
| 2017/0105152 | A1* | 4/2017 | Lou | H04W 36/08 |

* cited by examiner

*Primary Examiner* — Joseph E Dean, Jr.
(74) *Attorney, Agent, or Firm* — Xsensus LLP

(57) ABSTRACT

A wireless communication method and a wireless communication device are provided. Specifically, a spectrum management device is provided, which comprises one or more processors configured to estimate a future moving trajectory of a communication device based on a location of the communication device and an environment where the communication device is located, where the communication device is an unpredictable mobile device; determine a trajectory radiation area to be interfered by the communication device as it moves along the future moving trajectory; and instruct the communication device or an interfered device in the trajectory radiation area which is subjected to cofrequency interference with the communication device to perform an operation for reducing interference.

20 Claims, 10 Drawing Sheets ically illustrates an example of a commu-
WIRELESS COMMUNICATION METHOD AND WIRELESS COMMUNICATION DEVICE

TECHNICAL FIELD

The present disclosure relates to a wireless communication method and a wireless communication device, and in particular, to a wireless communication method and a communication device applied to a dense network and capable of effectively reducing interference with respect to a moving interference source.

BACKGROUND

With rapid development of wireless communication technology, the amount of data required by a user is increasing. In the fifth generation (5G) mobile communication technology, requirements for high speed, high capacity, high spectrum utilization and the like are proposed accordingly. Furthermore, intelligent terminal and the mobile Internet and the like also make the amount of mobile data grow exponentially. Large amount of data is in high demand especially in a crowded area such as a shopping mall, a gymnasium, an office building and an outdoor gathering area. In order to meet the requirements for the large amount of data, the high capacity and the like, a dense (and a ultra-dense) cell deployment has become one of the accepted solutions, where a high split gain is obtained by high-density cell deployment, thereby increasing system capacity greatly. Meanwhile, cognitive radio (CR) technology is applied to the dense network due to the capability of significantly improving the spectrum utilization. Multiple transceivers having cognitive function constitute a cognitive radio system (CRS).

However, there are many problems with the dense (and ultra-dense) cell deployment, for example, radio resource management and interference management in the dense network have become challenging problems due to denseness and uncertainty of cell distribution. Conventional interference management methods are generally applied for only static interference source. Serious burst interference may occur when a moving interference source appears in the network. In order to avoid interference between the interference source and a user equipment using the same spectrum with the interference source, additional spectrum resource is allocated to the user equipment. However, heavy system overhead may be generated due to the denseness of the cells and the mobility of the interference source.

Therefore, a solution applied to the dense network and capable of avoiding or reducing interference and reducing the system overhead is required.

SUMMARY

In order to solve the above problem, a spectrum management device in a communication system is provided according to an aspect of the present disclosure. The spectrum management device comprises one or more processors configured to: estimate a future moving trajectory of a communication device based on a location of the communication device and an environment where the communication device is located, where the communication device is an unpredictable mobile device; determine a trajectory radiation area to be interfered by the communication device as the communication device moves along the future moving trajectory; and instruct the communication device or an interfered device in the trajectory radiation area which is subjected to co-frequency interference with the communication device to perform an operation for reducing interference.

A method performed by a spectrum management device in a communication system is provided according to another aspect of the present disclosure. The method comprises: estimating a future moving trajectory of a communication device based on a location of the communication device and an environment where the communication device is located, where the communication device is an unpredictable mobile device; determining a trajectory radiation area to be interfered by the communication device as the communication device moves along the future moving trajectory; and instructing the communication device or an interfered device in the trajectory radiation area which is subjected to co-frequency interference with the communication device to perform an operation for reducing interference.

A communication system is provided according to another aspect of the present disclosure. The communication system comprises: an unpredictable moving communication device; one or more interfered devices subjected to co-frequency interference with the communication device, where the one or more interfered devices are configured to report information on a location, a speed, transmission power and a spectrum of the communication device to a spectrum management device; and the spectrum management device configured to estimate a future moving trajectory of the communication device based on the location of the communication device and an environment where the communication device is located, determine a trajectory radiation area to be interfered by the communication device as the communication device moves along the future moving trajectory, and for each of the interfered devices in the trajectory radiation area, instruct one of the interfered device and the communication device to perform an operation for reducing interference.

BRIEF DESCRIPTION OF THE DRAWINGS

The present disclosure may be better understood by referring to the following description given in conjunction with the drawings, the same or similar reference numbers are used throughout the drawings to represent the same or similar components. The drawings and the detailed description below, which are incorporated in the specification and constitute a part of the specification, are used to further describe preferred embodiments of the present disclosure and explain the principle and advantages of the present disclosure.

DETAILED DESCRIPTION OF THE EMBODIMENTS

Figure 1:
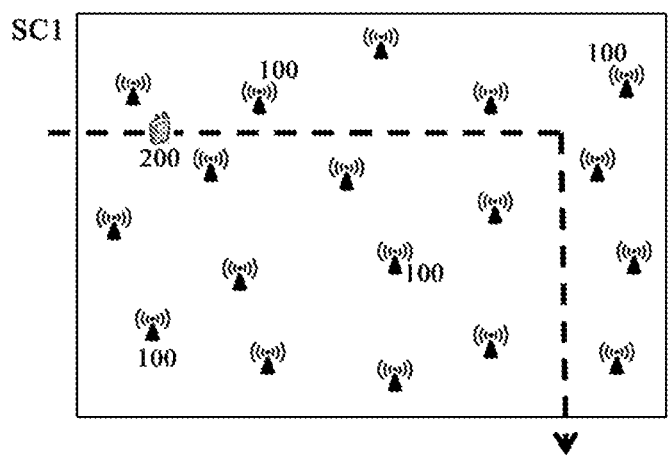
FIG. 1 schematically illustrates an example of a communication scenario to which the present disclosure is applied.
Figure 2:
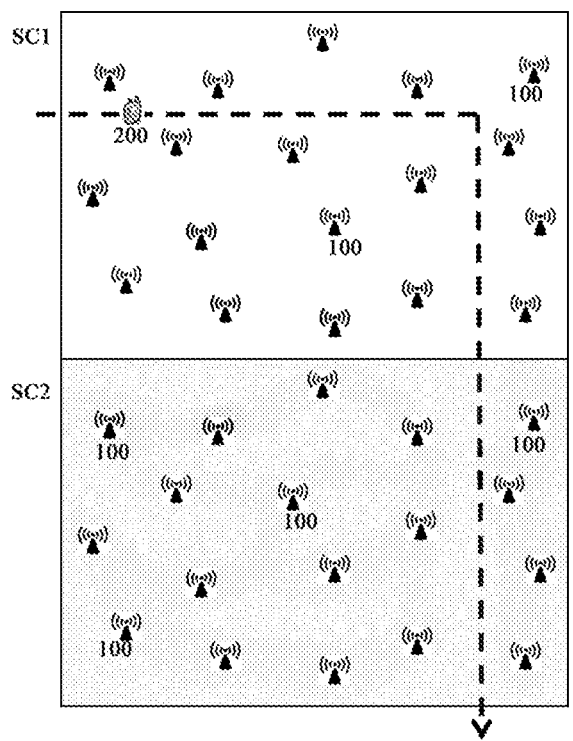
FIG. 2 schematically illustrates another example of the communication scenario to which the present disclosure is applied.

FIG. 1 and FIG. 2 schematically illustrate two communication scenarios to which the present disclosure is applied. As shown in FIG. 1, there are multiple communication devices 100 in a geographic area (as indicated by a rectangular box) managed by a spectrum coordinator SC1. As an example of the communication device 100, a base station (such as eNB) and a terminal device which use the cognitive radio (CR) technology may be included. A mobile device 200 moves into the area managed by the spectrum coordinator SC1, and co-frequency interference is induced between the mobile device 200 and the communication devices 100 which use the same spectrum with the mobile device 200 in the area. The mobile device 200 may be considered to be an unpredictable interference source. The unpredictable interference source here refers to a communication device which moves in a communication system and induces harmful interference to other communication entities in the communication system and therefore quality of service deteriorates. For example, the mobile device 200 may be a terminal device such as on-board equipment. As the mobile device 200 moves in the area (its trajectory is shown with the dashed line), the communication device 100 affected by the mobile device 200 may change accordingly.

FIG. 1 shows a case that the mobile device 200 passes through only an area managed by a single spectrum coordinator SC1, and FIG. 2 shows a more general case that the mobile device 200, as the interference source, moves through areas managed by multiple spectrum coordinators (as shown in FIG. 2, two spectrum coordinators, SC1 and SC2), where the dashed line shows a trajectory of the mobile device 200.

It is noted that, although only one interference source is shown in FIG. 1 and FIG. 2, there may be multiple interference sources. In a case that there are multiple moving interference sources, different processes for reducing interference may be performed based on distribution of the interference sources. For example, multiple interference sources which are dispersed geographically may be treated as individual interference sources independent from each other. Resource allocation in the system will not be changed frequently because these interference sources are dispersed. Here, for example, the dispersed interference sources may refer to the following interference sources: protection areas (described hereinafter) determined for such interference sources will not overlap with each other for a specific time period. Multiple aggregative co-frequency interference sources may be treated as a single-frequency entity. It is necessary to determine the range affected by the multiple co-frequency interference sources by calculating accumulated affected range. Therefore, a protection area determined for the multiple co-frequency interference sources is larger than a protection area determined for a single interference source. Multiple aggregative differ-frequency interference sources may be treated as a multi-frequency entity. It is necessary to determine the range affected by the multiple differ-frequency interference sources by calculating accumulated affected range. The process for the case of multiple differ-frequency interference sources is different from the process for the case of multiple co-frequency interference sources by that, processes are respectively performed with respect to multiple interference spectrums rather than a single interference spectrum in the determined protection area.

Figure 3:
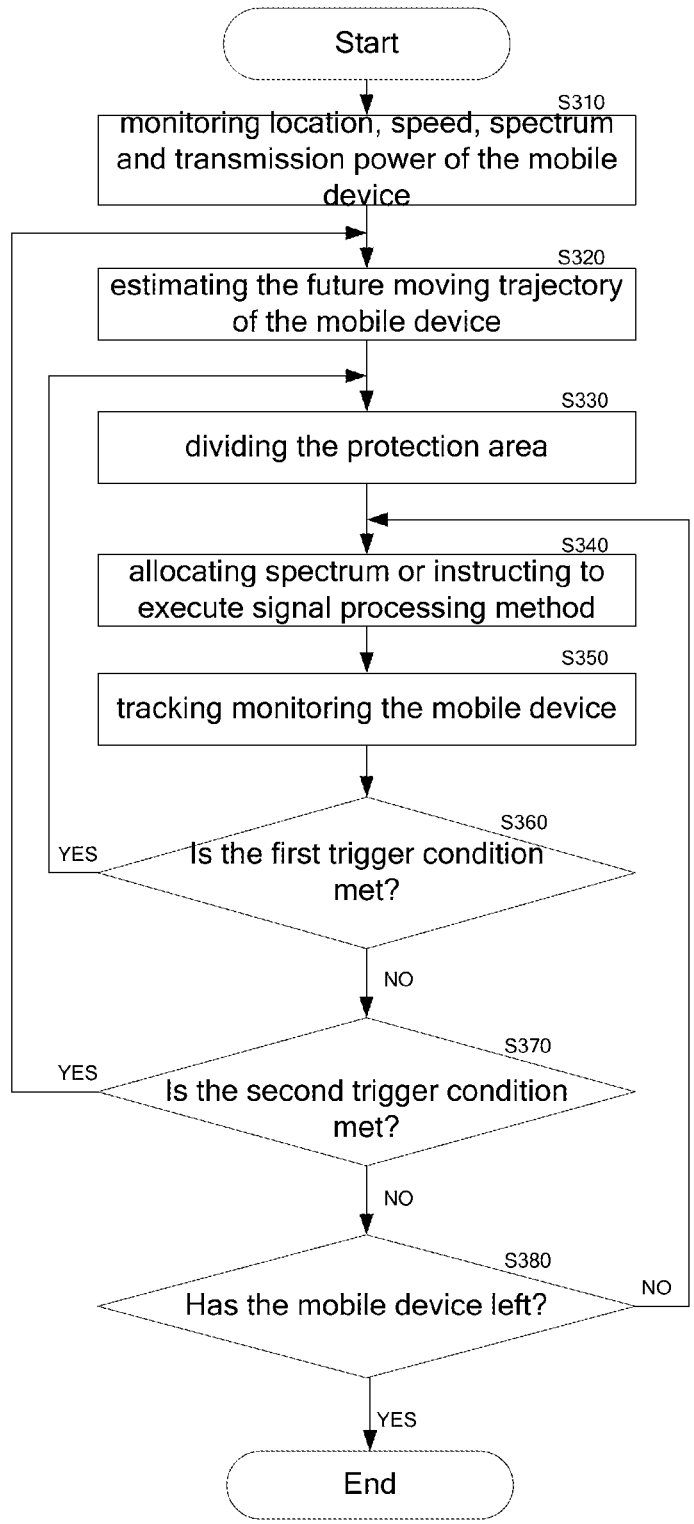
FIG. 3 is an overall flowchart of interference reduction method with respect to a moving interference source according to the present disclosure.

FIG. 3 shows a overall flowchart of the interference reduction method for a moving interference source according to the present disclosure. As shown in FIG. 3, in step S310, information on location, speed, the used spectrum and transmission power and the like of a mobile device 200 is monitored when the mobile device 200 as an interference source enters into an area managed by a spectrum coordinator SC. The above information may be detected and reported to the spectrum coordinator SC by a communication device 100 which is subjected to interference of the mobile device 200 in a case that the mobile device 200 is not under control of the spectrum coordinator SC. The above information may also be reported to the spectrum coordinator SC by the mobile device 200 itself in a case that the mobile device 200 is under control of the spectrum coordinator SC. The present disclosure is not limited to the manner described here, and may include any other manners of obtaining the above information on the mobile device 200.

In step S320, the spectrum coordinator SC estimates a future moving trajectory of the mobile device 200 based on the obtained information (such as current location, moving speed) of the mobile device 200 with reference to a geographic location database. In step S330, the spectrum coordinator SC determines a protection area based on the future moving trajectory. The protection area refers to an area which is affected by the interference of the mobile device 200. the protection area is changed dynamically as the mobile device 200 moves. Therefore, the protection area may also be considered to be a trajectory radiation area to be interfered by the communication device 200 as the communication device 200 moves along the moving trajectory. A method for determining the protection area based on the moving trajectory is described in detail below in conjunction with FIG. 7. After the protection area is determined, the spectrum coordinator SC can determine communication devices 100 in the protection area which use the same frequency with the mobile device 200.

In step S340, the spectrum coordinator SC perform is proper control over the mobile device 200 (in a case that the mobile device 200 is under control of the spectrum coordinator SC) and/or the communication device 100 which is subjected to interference of the mobile device 200 in the protection area, so as to reduce interference between the mobile device 200 and the communication device 100.

Specifically, as to the communication device 100 which enters into the protection area and accesses to the spectrum coordinator SC after the protection area is determined, the spectrum coordinator SC allocates to the communication device 100 spectrum different from the spectrum of the mobile device 200, thereby directly avoiding probability of generating interference, and furthermore reducing number of times of resource reconfiguration. In particular, in a case that there are multiple dissimilar-frequency interference sources as stated above, that is, in a case that there are multiple mobile devices 200 using different spectrums, a spectrum different from each of the spectrums used by the multiple mobile devices 200 is allocated to the newly accessed communication device 100.

As for the communication device 100 which already exists within the protection area when the protection area is determined, process is performed based on the following Table 1.

TABLE 1

| whether mobile device 200 is under control of SC | comparison of priority | | |
|---|---|---|---|
| | communication device 100 has higher priority | mobile device 200 has higher priority | mobile device 200 is malicious interference source |
| under control of SC | a different spectrum is allocated to mobile device 200 in a case that spectrum resource is sufficient; instruct mobile device 200 to execute signal processing method to reduce interference to communication device 100 in a case that spectrum resource is limited. | a different spectrum is allocated to communication device 100 in a case that spectrum resource is sufficient; instruct communication device 100 to execute signal processing method to reduce interference to mobile device 200 in a case that spectrum resource is limited. | a different spectrum is allocated to communication device 100 in a case that spectrum resource is sufficient; instruct communication device 100 to execute signal processing method to reduce interference from mobile device 200 in a case that spectrum resource is limited. |
| not under control of SC | a different spectrum is allocated to communication device 100 in a case that spectrum resource is sufficient; instruct communication device 100 to execute signal processing method to reduce interference from mobile device 200 in a case that spectrum resource is limited. | a different spectrum is allocated to communication device 100 in a case that spectrum resource is sufficient; instruct communication device 100 to execute signal processing method to reduce interference to mobile device 200 in a case that spectrum resource is limited. | a different spectrum is allocated to communication device 100 in a case that spectrum resource is sufficient; instruct communication device 100 to execute signal processing method to reduce interference from mobile device 200 in a case that spectrum resource is limited. |

As shown in Table 1, the spectrum coordinator SC determines different control methods based on whether the mobile device 200 is managed by the spectrum coordinator SC, a result of comparing a priority of the mobile device 200 with a priority of the interfered communication device 100, and whether additional allocable spectrum resource exists. The control methods include instructing the mobile device 200 or the communication device 100 to use an additional different spectrum, or to execute a signal processing method to reduce interference, which will be described in detail in conjunction with FIG. 4A and FIG. 4B hereinafter.

Various conventional technologies may be used as the signal processing method. For example, subspace projection technology can be used, which makes the useful signal orthogonal to the interference signal, thereby reducing or eliminating effect of the interference signal. Furthermore, interference may be eliminated by using beam forming technology based on constant modulus algorithm (CMA) in a case that the device is equipped with multiple antennas. Interference may be eliminated by using coordinated multi-point technology in a case that the device is equipped with a single antenna. It is noted that, the present disclosure is not limited to the method enumerated here, and may use any other signal processing technology capable of reducing or eliminating interference.

After the above processing method are performed with respect to the interference source, in the method according to the present disclosure, location, speed, spectrum and transmission power and the like of the mobile device 200 are monitored periodically at a preset monitoring time interval and reported to the spectrum coordinator SC, as shown in step S350. Accordingly, the spectrum coordinator SC may dynamically update the protection area based on the information in accordance to the movement of the mobile device 200.

The monitoring time interval may be preset based on one or more of type, moving speed, and moving trajectory of the mobile device 200, priority (Quality of Service requirement) of the communication device 100 and the like. For example, the monitoring time interval T may be set as $$T = \frac{l}{v},$$

where v is moving speed of the mobile device 200, l is a preset monitoring sensitivity distance. For example, l may be set to a distance from the mobile device 200 to an intersection in a case that the mobile device 200 moves on an urban road. Alternatively, the monitoring time interval T may also be a fixed value which is set artificially. Those skilled in the art may readily set the monitoring time interval T according to actual design requirement, which is not limited in the present disclosure.

With the information related to the mobile device 200 which is monitored periodically, the spectrum coordinator SC determines whether a first trigger condition is met in step S360. For example, the first trigger condition is that a distance from current location of the mobile device 200 to an edge of the protection area is less than or equal to a threshold value $d_{thresh3}$. In a case that the first trigger condition is met, it means that the mobile device 200 has moved to a position in vicinity of the edge of the protection area, and thus the current protection area can not reflect the range affected by the mobile device 200. Therefore, process returns to step S330, and the spectrum coordinator SC re-divides (updates) the protection area based on update information of the mobile device 200 obtained in step S350. On the contrary, if the first trigger condition is not met, process proceeds to step S370 to further determine whether a second trigger condition is met. For example, the second trigger condition is that a distance from the current location of the mobile device 200 to the estimated moving trajectory is equal to or greater than a threshold value $d_{thresh4}$. If the second trigger condition is met, it means that the moving trajectory determined previously can not match the movement of the mobile device 200 any more. Therefore, process returns to step S320, where the spectrum coordinator SC re-estimates the moving trajectory of the mobile device 200 based on the update information of the mobile device 200 obtained in step S350. On the contrary, if the second trigger condition is not met, it means that the moving trajectory used currently is still suitable for the mobile device 200. In this case, whether the mobile device 200 has left the area managed by the spectrum coordinator SC is further determined in step S380. The processing in step S340 continues to be performed in a case that the mobile device 200 still moves within the managed area. Process ends in a case that the mobile device 200 has left the managed area.

Processing performed by the spectrum coordinator SC in step S340 of FIG. 3 is described in detail below by referring to FIG. 4A and FIG. 4B.

Figure 4A:
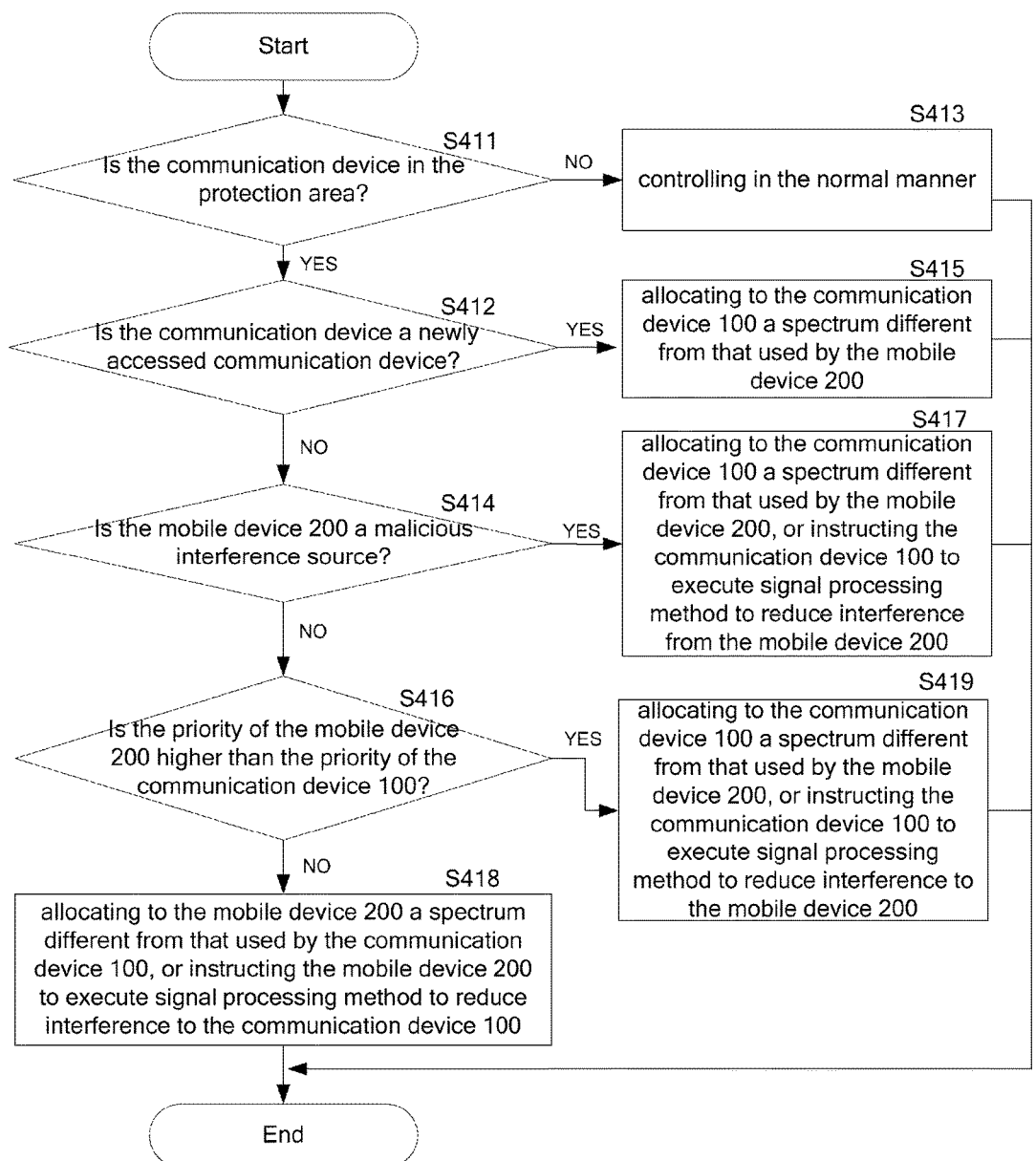
FIG. 4A and FIG. 4B are flowcharts for a process performed by a spectrum coordinator.

FIG. 4A shows a process flow in a case that the mobile device 200 is managed by the spectrum coordinator SC. As shown in FIG. 4A, in step S411, the spectrum coordinator SC determines whether each communication device managed by the spectrum coordinator SC is located in the protection area determined in step S330 of FIG. 3.

In a case that the communication device is not located in the protection area, it means that the communication device is not subjected to interference of the mobile device 200, or the interference on the communication device is low enough to be neglected. Therefore, the spectrum coordinator SC proceeds to step S413, where the communication device is controlled in a normal manner, that is, in the same manner as that when the mobile device 200 does not exist. In a case that the communication device is located in the protection area, the spectrum coordinator SC proceeds to step S412, to determine whether the communication device is a newly-accessed device after the protection area is divided.

If the communication device is the newly-accessed device, the spectrum coordinator SC allocates to the communication device a spectrum different from that used by the mobile device 200 in step S415, thereby directly avoiding probability of generating co-frequency interference. If the communication device has already existed within the protection area when the protection area is divided rather than a newly-accessed device, the spectrum coordinator SC proceeds to step S414, to determine whether the mobile device 200 is a malicious interference source. In the present disclosure, for example, the malicious interference source may refer to a mobile device which artificially and intentionally uses the same frequency as that used by the existing communication device.

In a case that the mobile device 200 is determined as the malicious interference source, in step S417, the spectrum coordinator SC allocates a spectrum different from that used by the mobile device 200 to the communication device 100 interfered by the mobile device 200, or instructs the communication device 100 to execute proper signal processing method to reduce the interference from the mobile device 200. In a case that the mobile device 200 is not the malicious interference source, the spectrum coordinator SC proceeds to step S416, where a priority of the mobile device 200 is compared with a priority of the communication device 100.

In a case that the mobile device 200 has the higher priority than the communication device 100, in step S419, the spectrum coordinator SC allocates a different spectrum to the communication device 100, or instructs the communication device 100 to execute proper signal processing method to reduce its interference to the mobile device 200. On the contrary, in a case that the mobile device 200 has the lower priority than the communication device 100, in step S418, the spectrum coordinator SC allocates a different spectrum to the mobile device 200, or instructs the mobile device 200 to execute proper signal processing method to reduce its interference to the communication device 100.

Figure 4B:
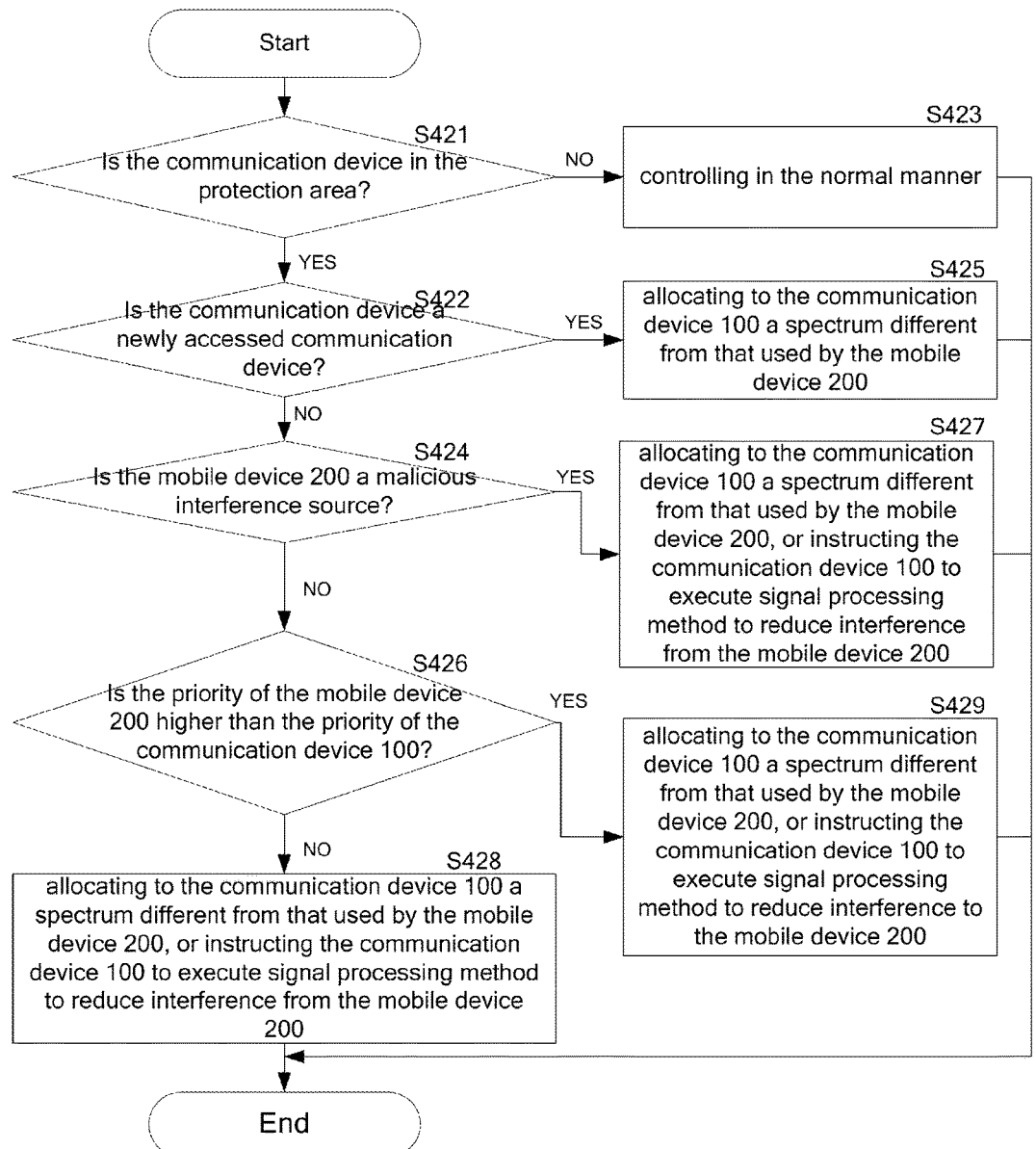

FIG. 4B shows a process flow in a case that the mobile device 200 is not managed by the spectrum coordinator SC. As shown in FIG. 4B, the spectrum coordinator SC determines whether each communication device managed by the spectrum coordinator SC is located in the determined protection area in step S421.

In a case that the communication device is not located in the protection area, the spectrum coordinator SC controls the communication device in the normal manner in step S423, that is, in the same manner as that when the mobile device 200 does not exist. In a case that the communication device is located in the protection area, the spectrum coordinator SC proceeds to step S422, to determine whether the communication device is a newly-accessed device after the protection area is determined.

If the communication device is the newly-accessed device, the spectrum coordinator SC allocates a different spectrum to the communication device in step S425, thereby avoiding probability of generating co-frequency interference. If the communication device is not the newly-accessed device, the spectrum coordinator SC proceeds to step S424, to determine whether the mobile device 200 is a malicious interference source.

In a case that the mobile device 200 is determined as the malicious interference source, in step S427, the spectrum coordinator SC allocates a different spectrum to the communication device 100 interfered by the mobile device 200, or instructs the communication device 100 to execute proper signal processing method to reduce the interference from the mobile device 200. In a case that the mobile device 200 is not the malicious interference source, the spectrum coordinator SC proceeds to step S426, where a priority of the mobile device 200 is compared with a priority of the communication device 100.

In a case that the mobile device 200 has the higher priority than the communication device 100, in step S429, the spectrum coordinator SC allocates a different spectrum to the communication device 100, or instructs the communication device 100 to execute proper signal processing method to reduce its interference to the mobile device 200. On the contrary, in a case that the mobile device 200 has the lower priority than the communication device 100, in step S428, the spectrum coordinator SC allocates a different spectrum to the mobile device 100, or instructs the communication device 100 to execute proper signal processing method to reduce the interference from the mobile device 200.

Figure 5:
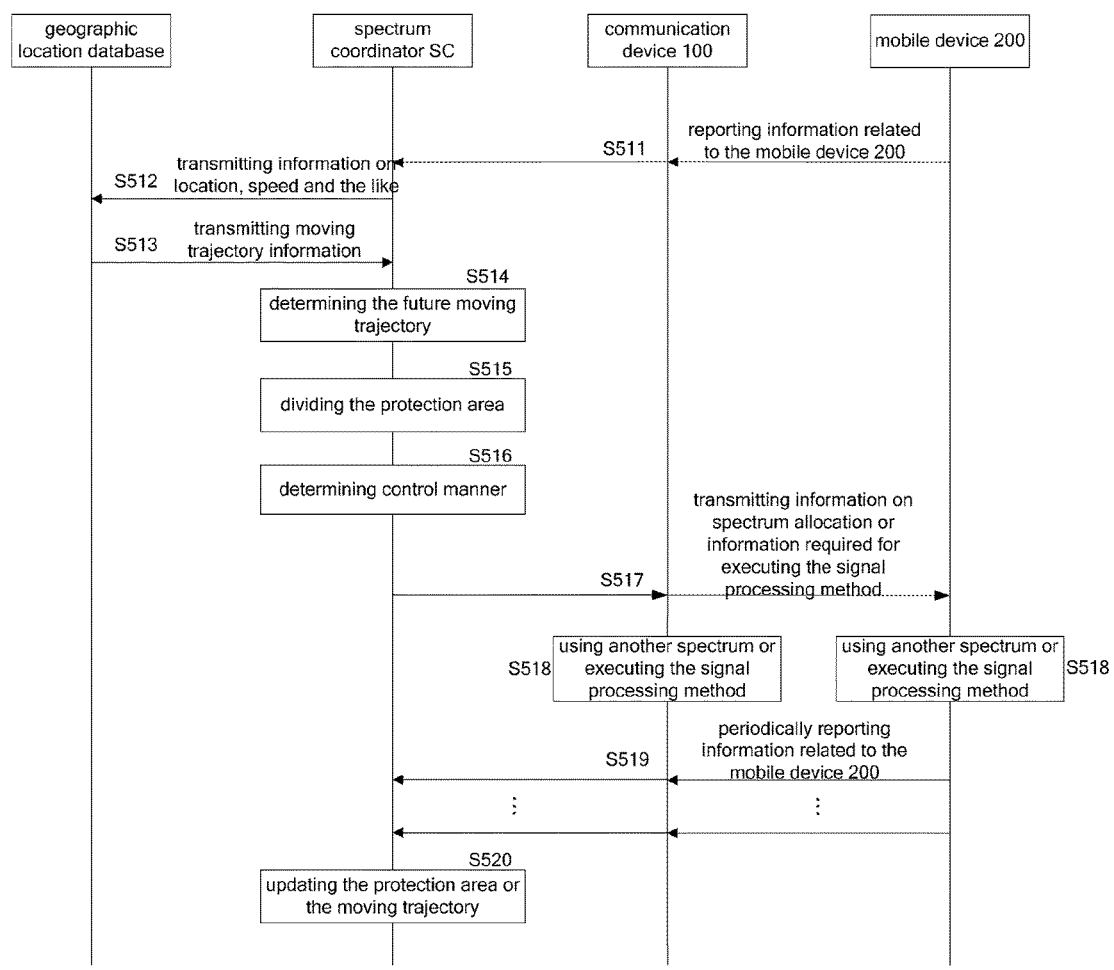
FIG. 5 is an information interaction diagram of the interference reduction method according to the present disclosure.

Information interaction for the interference reduction method according to the present disclosure is described below in conjunction with FIG. 5. As shown in FIG. 5, the communication device 100 monitors information on location, speed, transmission power, spectrum and the like of the mobile device 200 which is the interference source, and reports the result of monitoring to the spectrum coordinator SC, as shown in step S511. As stated above, the above information may also be reported to the spectrum coordinator SC by the mobile device 200 itself, or reported to the spectrum coordinator SC in any proper known manner.

The spectrum coordinator SC transmits the obtained location information and speed information of the mobile device 200 to a geographic location database in step S512. The geographic location database may obtain the moving trajectory information of the mobile device 200, such as information on a position where the mobile device 200 would be in certain time in the future, road identification information and the like, after querying the database. The geographic location database provides the moving trajectory information to the spectrum coordinator SC in step S513.

The spectrum coordinator SC estimates the future moving trajectory of the mobile device 200 based on the moving trajectory information obtained from the geographic location database in step S514, and determines the protection area based on the estimated moving trajectory in step S515. Then, the spectrum coordinator SC determines the manners for controlling the communication device 100 located in the protection area and the mobile device 200 which is the interference source, in order to reduce interference between the communication device 100 and the mobile device 200, as shown in step S516. Specific control manners are described above in conjunction with FIG. 4A and FIG. 4B.

After the spectrum coordinator SC determines the control manners (for example, allocating spectrum resource or executing signal processing method), the spectrum coordinator SC transmits information on spectrum allocation or information required for executing the signal processing method to the communication device 100 or the mobile device 200 in step S517. Here, for example, the information on spectrum allocation may include the allocated spectrum and usage period, and the information required for executing the signal processing method depends on the signal processing method. For example, in a case that the communication device 100 is instructed to execute interference alignment processing, the spectrum coordinator SC needs to inform the communication device 100 of location information and antenna angle information of the mobile device 200.

Then, the communication device 100 or the mobile device 200 performs corresponding operations according to the information indicated by the spectrum coordinator SC in step S518. In a case that the information on spectrum allocation is transmitted by the spectrum coordinator SC, the communication device 100 or the mobile device 200 uses the allocated spectrum during the indicated usage period. In a case that the spectrum coordinator SC instructs to execute the signal processing method and transmits the required information, the communication device 100 or the mobile device 200 performs the corresponding signal processing in order to reduce interference between the communication device 100 and the mobile device 200.

As stated above, in the process of taking action to reduce interference, it is still necessary to monitor the state of the mobile device 200. Therefore, as shown in step S519, the communication device 100 periodically reports information on location, speed, transmission power and spectrum and the like of the communication device 200 to the spectrum coordinator SC at a preset time interval. Alternatively, the mobile device 200 may periodically report the information described above in a case that the mobile device 200 is managed by the spectrum coordinator SC.

The spectrum coordinator SC determines whether an update condition (for example, a first trigger condition, a second trigger condition) is met based on the information reported periodically, and updates the protection area or the moving trajectory of the mobile device 200 when a specific condition is met, as shown in step S520.

After the update is completed, the spectrum coordinator SC performs processing in steps S516 to S519 again based on the updated protection area or the updated moving trajectory. The processing of the spectrum coordinator SC does not end until the mobile device 200 moves out of the area managed by the spectrum coordinator SC.

Figure 6:
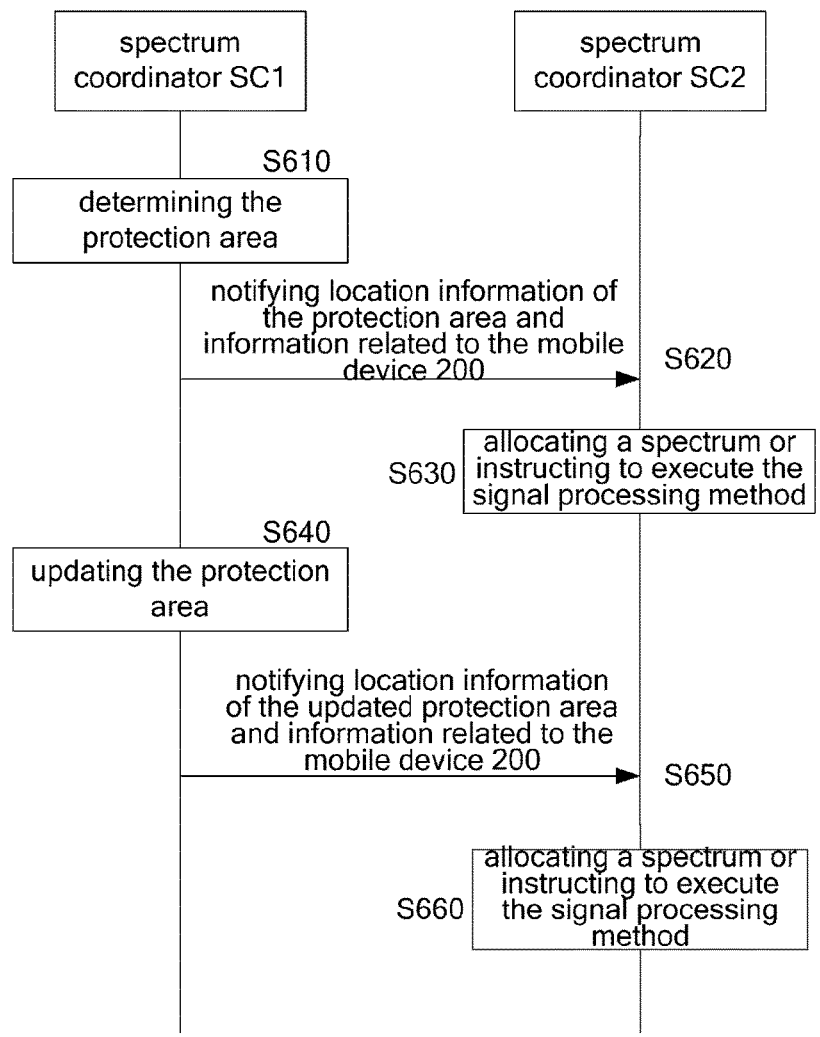
FIG. 6 is another information interaction diagram of the interference reduction method according to the present disclosure.

FIG. 6 shows information interaction in a case that the mobile device 200 moves through areas managed by multiple spectrum coordinators SC.

In conjunction with FIG. 2, the mobile device 200 is currently located in an area managed by spectrum coordinator SC1. As stated above, the spectrum coordinator SC1 estimates a future moving trajectory of the mobile device 200 and determines a protection area based on the future moving trajectory, as shown in step S610 of FIG. 6.

In a case that the estimated moving trajectory (as shown with the dashed line in FIG. 2) passes through an area managed by spectrum coordinator SC2 and thus the determined protection area includes the area managed by the spectrum coordinator SC2, the spectrum coordinator SC1 informs the spectrum coordinator SC2 of location information of the determined protection area and information on location, speed, transmission power and spectrum and the like of the mobile device 200 in step S620.

Accordingly, in step S630, the spectrum coordinator SC2 controls the communication device 100 which is located in the area managed by the spectrum coordinator SC2 in the protection area and subjected to co-frequency interference based on the obtained information described above. The control includes allocating a spectrum different from that used by the mobile device 200 to the communication device 100, or instructing the communication device 100 to execute signal processing method to reduce interference.

After the spectrum coordinator SC1 updates the protection area in step S640, in a case that the updated protection area still includes the area managed by the spectrum coordinator SC2, the spectrum coordinator SC1 infants the spectrum coordinator SC2 of location infatuation of the updated protection area and the updated information related to the mobile device 200 in step S650. Accordingly, the spectrum coordinator SC2 may perform control based on the updated information in step S660.

Those skilled in the art will easily understand that, in a case that the updated protection area further includes an area managed by another spectrum coordinator (for example, SC3, SC4 . . . and the like), the spectrum coordinator SC1 also informs such spectrum coordinator of the updated information in step S650, so that such spectrum coordinator may perform corresponding controls on the interfered communication device 100 managed by it.

Figure 7:
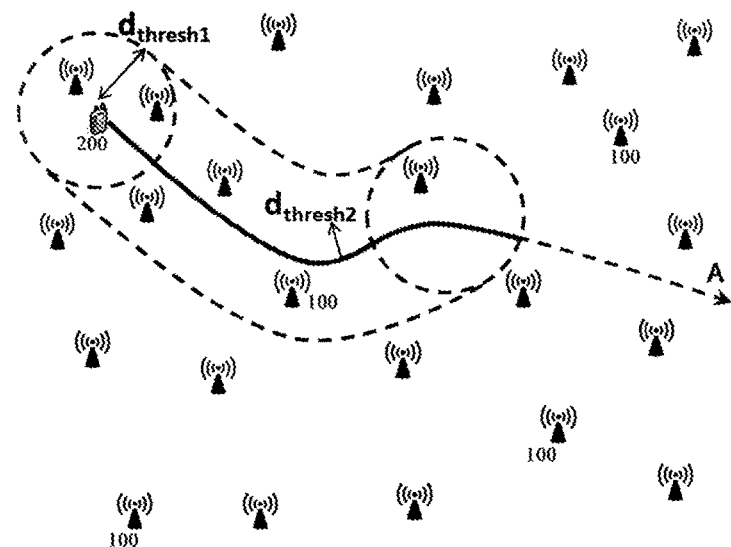
FIG. 7 is a schematic diagram of protection area.

The method for determining a protection area by the spectrum coordinator SC in step S330 of FIG. 3 is described below in conjunction with FIG. 7. As shown in FIG. 7, a curve A represents the moving trajectory of the mobile device 200 which is estimated by the spectrum coordinator SC. $d_{thresh1}$ represents interference influence radius of the mobile device 200. A solid-line part of the curve A corresponds to a route along which the mobile device 200 will pass and induce interference for a certain time period. The length of the route is $d_{thresh2}$, which determines the length of the protection area along the moving trajectory. It can be seen from FIG. 7 that, the range (as shown with the dashed-line ring in FIG. 7) of the protection area can be determined by determining $d_{thresh1}$ and $d_{thresh2}$ with taking the moving trajectory as an axis.

Therefore, the spectrum coordinator SC firstly calculates the interference influence radius $d_{thresh1}$ of the mobile device 200 according to the following equation (1):

$$d_{thresh1} = f(P_{ti}, \text{SINR}_{thresh}, h) \quad (1)$$

where $P_{ti}$ represents the transmission power of the mobile device 200; h represents a channel model; $\text{SINR}_{thresh}$ represents a threshold for a signal-to-interference-plus-noise ratio of the communication device 100, which is a value predetermined based on the quality of service (QoS) requirement and the priority of the communication device 100; f( ) represents a certain mapping relationship.

A simplified path loss model is shown by the following equation (2):

$$P_r = P_t + K - 10\gamma \log_{10}\left[\frac{d}{d_0}\right] \quad (2)$$

where Pr represents the received signal power, and Pt represents the transmitted signal power, both in units of dBm; K is a constant depending on antenna characteristic and average channel loss, in units of dB; d is a distance between a transmitter and a receiver, in units of meter (m); $d_0$ is a reference distance for antenna far-field, in units of meter (m); and γ is path loss index. K, $d_0$ and γ may be selected properly to approximate to analytic model or empirical model.

The equation (2) is generally applied only in a case of a transmission distance $d > d_0$, where $d_0$ generally ranges from 1 m to 10 m indoor, and from 10 m to 100 m outdoor. γ depends on propagation environment. K is generally free space path gain of an omni-directional antenna at a distance of $d_0$, as shown in the following equation (3):

$$K \text{ (dB)} = 20\log_{10}\frac{\lambda}{4\pi d_0} \quad (3)$$

where λ is wavelength of a signal, in units of meter (m).

Based on the path loss model shown in the above equation (2), we obtain:

$$\begin{cases} 10\log_{10}(P_{ri} + N) = P_{ts} - \text{SINR}_{thresh} \\ P_{ri} = P_{ti} + K - 10\gamma\log_{10}\left[\frac{d_{thresh1}}{d_0}\right] \end{cases} \quad (4)$$

and then obtain:

$$d_{thresh1} = f(P_{ti}, \text{SINR}_{thresh}, h) \quad (5)$$
$$= 10^{\left(\frac{P_{ti}+K-P_{ri}}{10\gamma}\right)} d_0$$

$$P_{ri} = 10\log_{10}\left[10^{\left(\frac{P_{ts}-\text{SINR}_{thresh}}{10}\right)} - N\right] \quad (6)$$

where N represents noise power in units of mW; $P_{ts}$ represents transmission power of the communication device 100 in units of dBm; $P_{ri}$ represents power of interference induced by the mobile device 200 to the communication device 100 which is located at a distance of $d_{thresh1}$ in units of dBm.

It can be seen from the equation (5) that, for example, as the transmission power $P_{ti}$ of the mobile device 200 increases, the calculated $d_{thresh1}$ increases, and the width of the protection area increases, vice versa. Therefore, it is possible to adapt to the change in interfering capability of the mobile device 200.

As described above, the interference influence radius $d_{thresh1}$ of the mobile device 200 has been determined. Then, the spectrum coordinator SC determines $d_{thresh2}$ according to the following equation (7):

$$d_{thresh2} = vt_1 \quad (7)$$

where v is the moving speed of the mobile device 200; $t_1$ is a preset time duration of the protection area, that is, the determined protection area is valid during the time duration $t_1$.

It can be seen from the equation (7) that, as the moving speed of the mobile device 200 increases, $d_{thresh2}$ increases, and the length of the determined protection area increases accordingly. Therefore, it is possible to effectively adapt to the mobility of the mobile device 200.

It is noted that, the protection area is not the bigger the better. If the protection area is set to be too large, once the mobile device 200 changes its moving trajectory, it would be very inflexible to dynamically adjust the protection area, and the number of times for reconfiguring system resource and the system overload would be increased. Therefore, it is necessary to set the protection area reasonably.

Furthermore, as described above, the threshold value $d_{thresh3}$ is a preset threshold value for the distance from the mobile device 200 to the edge of the protection area. Referring to FIG. 7, it is easy to understand that, in a case that the distance from the mobile device 200 to the edge of the protection area is less than or equal to the threshold value $d_{thresh3}$, the mobile device 200 is in vicinity of to the edge rather than located in a center of the protection area. It is apparent that such protection area is not adapted to the current location of the mobile device 200, and does not match with the current interference range of the mobile device 200. Therefore, the spectrum coordinator SC needs to re-divide the protection area based on current information of the mobile device 200.

For example, the threshold value $d_{thresh3}$ may be set according to the following equation (9):

$$d_{thresh3} = d_{thresh1} + vt_2 \quad (9)$$

where v is moving speed of the mobile device 200, and $t_2$ is spectrum switching time for a cognitive radio system.

Figure 8:
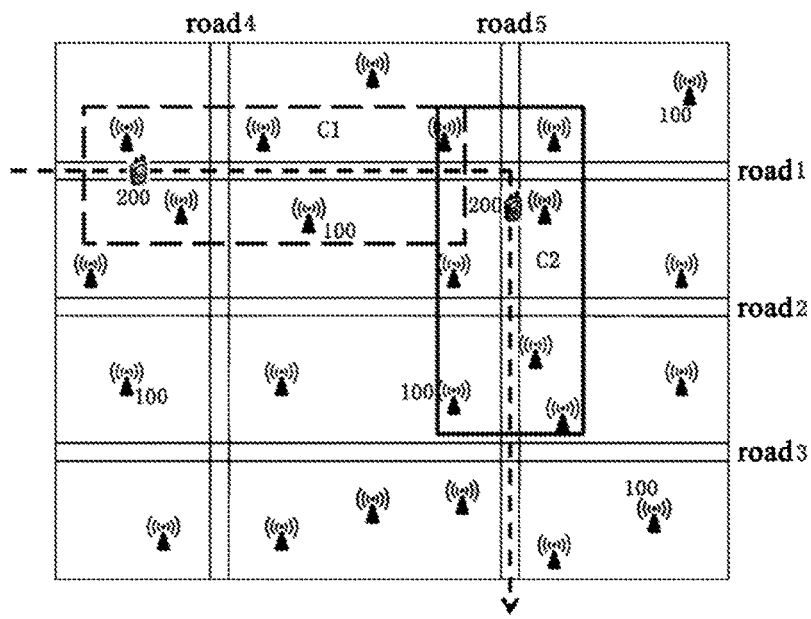
FIG. 8 is a schematic diagram of updating the protection area.

FIG. 8 shows a schematic diagram of update of the protection area. As shown in FIG. 8, the dashed line indicates the moving trajectory of the mobile device 200. As shown with the dashed-line rectangular box on the left, protection area C1 may be determined when the mobile device 200 moves along road 1. As the mobile device 200 moves forwards, the protection area C1 may accordingly moves toward right in FIG. 8. When the mobile device 200 turns right on the road 1 to road 5, the protection area C1 may be updated with protection area C2, as shown by the solid-line rectangular box on the right. Therefore, the protection area is updated dynamically based on the moving trajectory of the mobile device 200 so as to control communication devices which are currently interfered by the mobile device 200, thereby reducing interference.

The principle and the technical solution of the present disclosure are described in conjunction with respective embodiments above. For example, the technical solution according to the present disclosure may be applied to a densely deployed 802.19 coexistence system. When a moving interference source passes through the system, the system usually needs to reallocate resource to ensure quality of service for current users. The problems of interference and heavy overhead for resource allocation can be solved by applying the present invention. Furthermore, for example, the present invention may be applied to the third generation partnership project (3GPP), in particular to a "vehicle to external" (V2X) network. A moving trajectory of a moving interference source is mostly along a road in a case that the moving interference source is an on-board equipment. Therefore, the future moving trajectory of the moving interference source may be estimated based on the road in the present invention.

The present invention can solve a series of problems brought by the moving interference source in a (ultra) dense dynamic spectrum access network, for example, frequent resource allocation, heavy system overhead, performance deterioration of current users due to harmful interference, decreased spectrum utilization and the like. In a case that the current user has a higher priority than the moving interference source or the interference source is a malicious interference source, interference of the moving interference to the current users can be reduced effectively, thereby ensuring the quality of service for the current users. In the other hand, interference of the current users to the interference source can also be reduced. Furthermore, with the solution of the present invention, number of times of reallocating resource can be reduced significantly and the system overhead can be reduced.

In the future fifth generation (5G) mobile communication technology, the cognitive radio technology is generally applied to a (ultra) dense network in which problems regarding interference and overhead are significant. The present invention can solve these problems and thus has important practical significance.

The present invention can be applied to various products. For example, the communication device 100 in the above-described embodiments may be implemented as a base station, including evolved node B (eNB) of any type, such as macro eNB and small eNB. The small eNB may be an eNB which covers a cell smaller than a macro cell, such as pico eNB, micro eNB and home (femto) eNB. Alternatively, the base station may include any other type of base station, such as Node B and base transceiver station (BTS). The base station may include: a main body (also referred to as base station device) configured to control the wireless communication, and one or more remote radio head (RRH) provided at a different site from the main body. Further, various types of terminal devices may function as a base station by performing the function of the base station temporarily or semi-permanently.

In another aspect, the communication device 100 or the mobile device 200 in the above-described embodiments may be implemented as a communication terminal device (such as smart phone, panel personal computer (PC), notebook PC, portable game terminal, portable/dongle mobile router and digital camera) or an on-board terminal device (such as car navigation device). The communication device 100 or the mobile device 200 may also be implemented as a terminal device for performing machine to machine (M2M) communication, which is also referred to as a machine-type communication (MTC) terminal device. Further, the communication device or the mobile device may be a wireless communication module mounted on each of the above terminals (such as integrated circuit module including a single chip).

The implementation of the communication device 100 or the mobile device 200 is described below by taking smart phone as an example in conjunction with FIG. 9.

Figure 9:
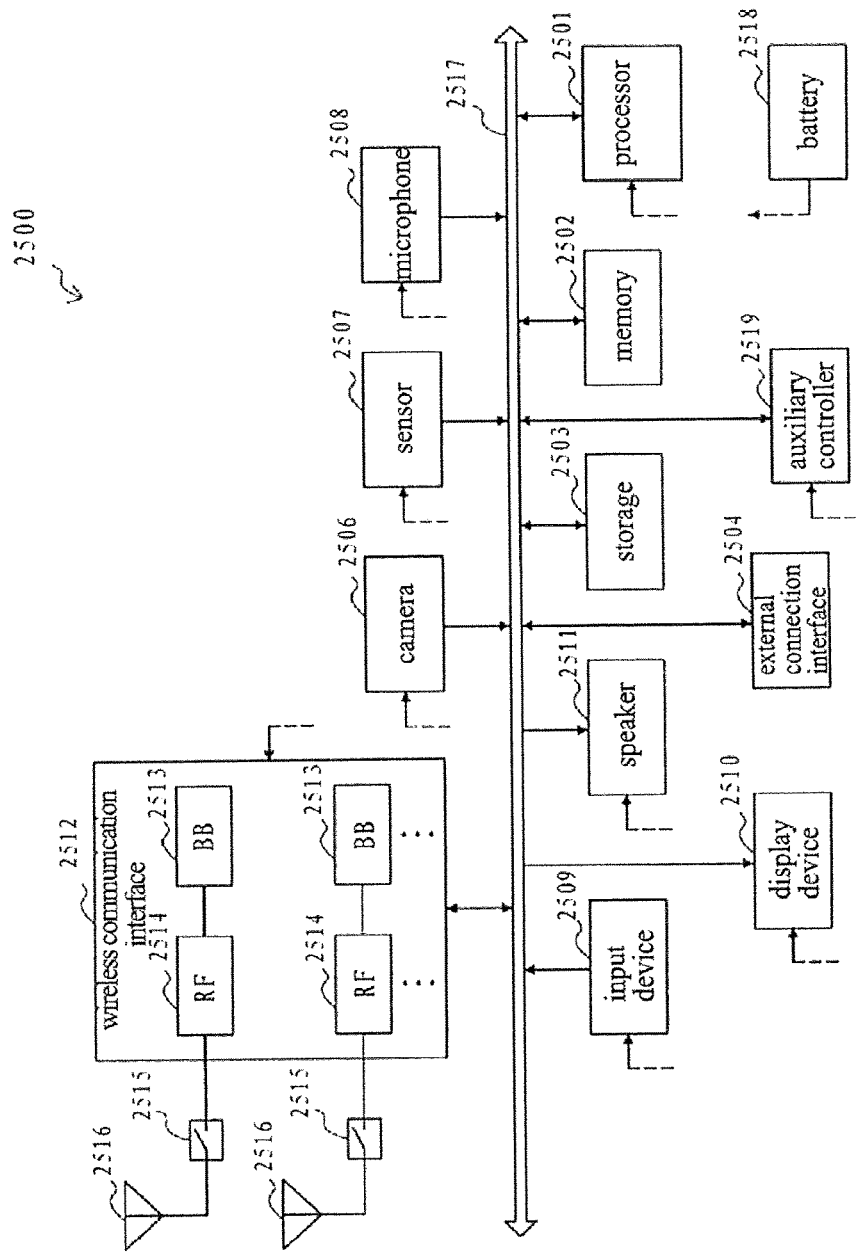
FIG. 9 is a schematic configuration block diagram of a smartphone as an example of the moving interference source or the interfered communication device.

FIG. 9 shows a block diagram of a schematic configuration of a smart phone. As shown in FIG. 9, the smart phone 2500 includes a processor 2501, a memory 2502, a storage 2503, an external connection interface 2504, a camera 2506, a sensor 2507, a microphone 2508, an input device 2509, a display device 2510, a speaker 2511, a wireless communication interface 2512, one or more antenna switches 2515, one or more antennas 2516, a bus 2517, a battery 2518 and an auxiliary controller 2519.

The processor 2501 may be, for example, CPU or System On Chip (SoC), and controls functions of application layer and other layers of the smart phone 2500. The memory 2502 includes RAM and ROM, and stores programs executed by the processor 2501 and data. The storage 2503 may include a storage medium such as semiconductor memory and hard disk. The external connection interface 2504 is an interface for connecting an external device (such as memory card and universal serial bus (USB) device) to the smart phone 2500.

The camera 2506 includes an image sensor (such as charge coupled device (CCD) and complementary metal oxide semiconductor (CMOS)), and generates a captured image. The sensor 2507 may include a set of sensors such as measurement sensor, gyro sensor, geomagnetic sensor and acceleration sensor. The microphone 2508 converts sounds that are input to the smart phone 2500 to audio signals. The input device 2509 includes, for example, a touch sensor configured to detect touch on a screen of the display device 2510, a keypad, a keyboard, a button or a switch, and receives operation or information input from a user. The display device 2510 includes a screen (such as liquid crystal display (LCD) and organic light-emitting diode (OLED) display), and displays output image of the smart phone 2500. The speaker 2511 converts audio signals output from the smart phone 2500 into sounds.

The wireless communication interface 2512 supports any cellular communication scheme (such as LIE and LTE-Advanced), and performs wireless communication. The wireless communication interface 2512 may typically include, for example, a baseband (BB) processor 2513 and a radio frequency (RF) circuit 2514. The BB processor 2513 may perform, for example, encoding/decoding, modulating/demodulating and multiplexing/demultiplexing, and perform various types of signal processing for wireless communication. Meanwhile, the RF circuit 2514 may include, for example, a mixer, a filter and an amplifier, and transmit and receive wireless signals via the antenna 2516. The wireless communication interface 2512 may be a chip module with the BB processor 2513 and the RF circuit 2514 integrated therein. As shown in FIG. 9, the wireless communication interface 2512 may include multiple BB processors 2513 and multiple RF circuits 2514. However, the wireless communication interface 2512 may also include a single BB processor 2513 or a single RF circuit 2514.

Furthermore, in addition to the cellular communication schemes, the wireless communication interface 2512 may support another type of wireless communication scheme such as short-range wireless communication scheme, near field communication scheme, and wireless local area network (LAN) scheme. In this case, the wireless communication interface 2512 may include the BB processor 2513 and the RF circuit 2514 for each wireless communication scheme.

Each of the antenna switches 2515 switches connection destination of the antenna 2516 among multiple circuits (such as circuits for different wireless communication schemes) included in the wireless communication interface 2512.

Each of the antennas 2516 includes a single antenna element or multiple antenna elements (such as multiple antenna elements included in an MIMO antenna), and is used for the wireless communication interface 2512 to transmit and receive wireless signals. As shown in FIG. 9, the smart phone 2500 may include multiple antennas 2516. However, the smart phone 2500 may also include a single antenna 2516.

Furthermore, the smart phone 2500 may include the antenna 2516 used for each wireless communication scheme. In this case, the antenna switch 2515 may be omitted in the configuration of the smart phone 2500.

The bus 2517 connects the processor 2501, the memory 2502, the storage 2503, the external connection interface 2504, the camera 2506, the sensor 2507, the microphone 2508, the input device 2509, the display device 2510, the speaker 2511, the wireless communication interface 2512, and the auxiliary controller 2519 to each other. The battery 2518 supplies power to respective components of the smart phone 2500 via feeders which are partially shown with dashed lines in FIG. 9. The auxiliary controller 2519 for example performs the minimum function necessary for the smart phone 2500 in a sleep mode.

In the smart phone 2500 as shown in FIG. 9, a transceiving device of the terminal device may be implemented with the wireless communication interface 2512. At least a part of the functions of respective functional units of the terminal device may also be implemented with the processor 2501 or the auxiliary controller 2519. For example, a part of functions of the processor 2501 may be performed by the auxiliary controller 2519 and therefore consumption of power of the battery 2518 is reduced. Furthermore, the processor 2501 or the auxiliary controller 2519 may perform at least a part of the functions of respective functional units of the terminal device by executing programs stored in the memory 2502 or the storage 2503.

The implementation of the communication device 100 is described below by taking eNB as an example in conjunction with FIG. 10.

Figure 10:
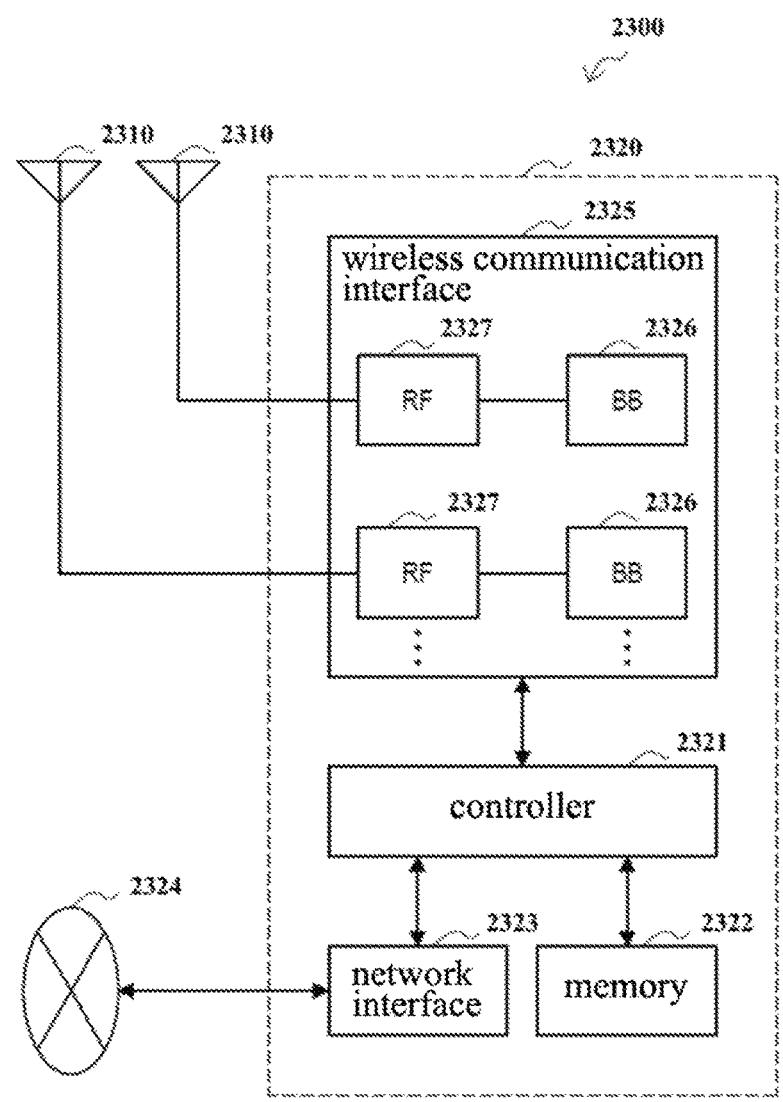
FIG. 10 is a schematic configuration block diagram of an evolved base station (eNB) as an example of the interfered communication device.

FIG. 10 shows a block diagram of a schematic configuration of an eNB. As shown in FIG. 10, eNB 2300 includes one or more antennas 2310 and a base station device 2320. The base station device 2320 and each antenna 2310 may be connected with each other via radio frequency (RF) cable.

Each of the antennas 2310 includes a single antenna element or multiple antenna elements (such as multiple antenna elements included in the multiple-input multiple-output (MIMO) antenna), and is used for transmitting and receiving the wireless signals by the base station device 2320. As show in FIG. 10, the eNB 2300 may include multiple antennas 2310. For example, the multiple antennas 2310 may be compatible with multiple frequency bands used by the eNB 2300. The eNB 2300 may also include a single antenna 2310 although FIG. 10 shows an example that the eNB 2300 includes multiple antennas 2310.

The base station device 2320 includes a controller 2321, a memory 2322, a network interface 2323 and a wireless communication interface 2325.

For example, the controller 2321 may be CPU or DSP, and may perform various functions of higher layers of the base station device 2320. For example, the controller 2321 generates data packets based on the data in the signal processed by the wireless communication interface 2325, and transfers the generated packets via the network interface 2323. The controller 2321 may bundle data from multiple baseband processors to generate bundled data, and transfer the generated bundled data. The controller 2321 may have logical functions to perform controls such as radio resource control, radio bearer control, mobility management, access control and scheduling. The controls may be performed in cooperation with the neighboring eNB or a core network node. The memory 2322 includes RAM and ROM, and stores the programs to be executed by the controller 2321 and various types of control data (such as terminal list, transmission power data and scheduling data).

The network interface 2323 is a communication interface for connecting the base station device 2320 to the core network 2324. The controller 2321 may communicate with the core network node or another eNB via the network interface 2323. In this case, the eNB 2300 and the core network node or the other eNB may be connected with each other via a logic interface (such as S1 interface and X2 interface). The network interface 2323 may also be a wired communication interface or a wireless communication interface for wireless backhaul. If the network interface 2323 is a wireless communication interface, the network interface 2323 may use a higher frequency band for wireless communication than that used by the wireless communication interface 2325.

The wireless communication interface 2325 supports any cellular communication scheme (such as long term evolution (LTE) and LTE-Advanced), and provides wireless connection to a terminal located in the cell of the eNB 2300 via the antenna 2310. The wireless communication interface 2325 may generally include for example the BB processor 2326 and the RF circuit 2327. The BB processor 2326 may perform for example coding/decoding, modulation/demodulation and multiplexing/de-multiplexing, and may perform various types of signal processing for the layers (for example L1 layer, media access control (MAC) layer, radio link control (RLC) layer and packet data convergence protocol (PDCP) layer). Instead of the controller 2321, the BB processor 2326 may have some or all of the above logical functions. The BB processor 2326 may be a memory storing communication control programs, or a module including a processor and related circuits configured to execute the programs. The programs may be updated to change the function of the BB processor 2326. The module may be a card or blade inserted into a slot of the base station device 2320. Alternatively, the module may be a chip mounted on the card or the blade. The RF circuit 2327 may include for example a mixer, a filter and an amplifier, and may transmit and receive wireless signals via the antenna 2310.

As shown in FIG. 10, the wireless communication interface 2325 may include multiple BB processors 2326. For example, the multiple BB processors 2326 may be compatible with the multiple frequency bands used by the eNB 2300. As shown in FIG. 10, the wireless communication interface 2325 may include multiple RF circuits 2327. For example, the multiple RF circuits 2327 may be compatible with multiple antenna elements. Although the example in which the wireless communication interface 2325 includes multiple BB processors 2326 and multiple RF circuits 2327 is shown in FIG. 10, the wireless communication interface 2325 may include a single BB processor 2326 and a single RF circuit 2327.

In the eNB 2300 shown in FIG. 10, a transceiving device of the base station side device may be implemented with the wireless communication interface 2325. At least a part of the functions of respective functional units may be performed by the controller 2321. For example, the controller 2321 may perform at least a part of the functions of respective functional units by executing programs stored in the memory 2322.

The various devices or modules described herein are only logical and do not strictly correspond to physical devices or entities. For example, the function of each of the modules described herein may be implemented by multiple physical entities, or the functions of multiple modules described herein may be implemented by a single physical entity. Furthermore, it should be noted that, the features, components, elements, steps and the like described in one embodiment are not limited to that embodiment, and may also be applied to other embodiments, for example by replacing specific features, components, elements, steps and the like in other embodiments, or by combining with the same in other embodiments.

A series of processes performed by each device or module in the above-described embodiments may be implemented by software, hardware, or a combination of software and hardware. The programs included in the software may be stored in advance in a storage medium provided inside or outside each device. As an example, during execution, the programs are written to a random access memory (RAM) and executed by a processor (such as a CPU).

Figure 11:
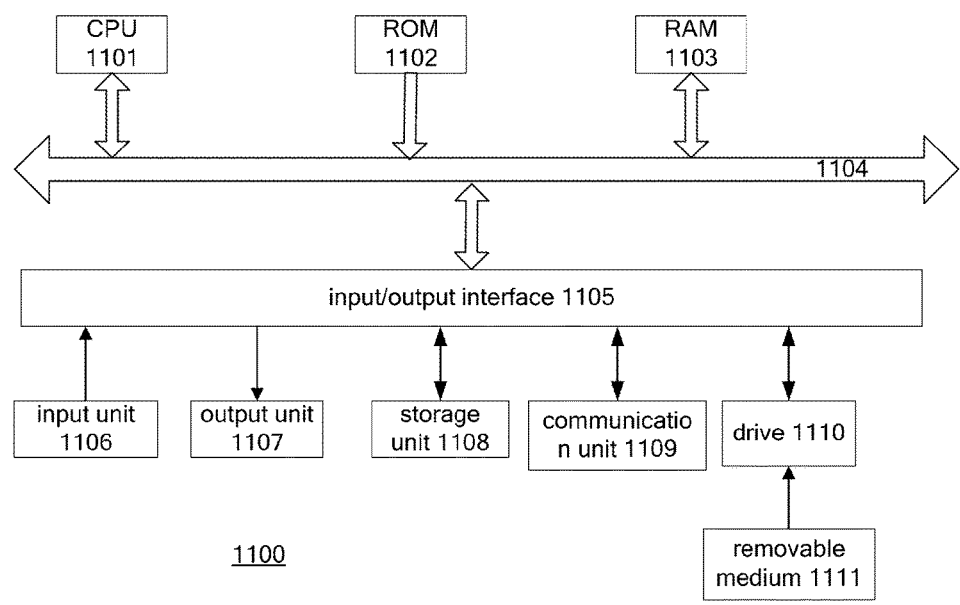
FIG. 11 is an exemplary configuration block diagram of computer hardware.

FIG. 11 is an exemplary configuration block diagram of computer hardware which performs the above-described processes according to the programs.

In a computer 1100, a central processing unit (CPU) 1101, a read only memory (ROM) 1102 and a random access memory (RAM) 1103 are connected with each other via a bus 1104.

An input/output interface 1105 is further connected to the bus 1104. The input/output interface 105 is connected with the following components: an input unit 1106 formed by a keyboard, a mouse, a microphone and the like; an output unit 1107 formed by a display, a speaker and the like; a storage unit 1108 formed by a hard disk, a non-volatile memory and the like; a communication unit 1109 formed by a network interface card (such as a local area network (LAN) card, a modem and the like); and a drive 1110 for driving a removable medium 1111 such as a magnetic disk, an optical disk, a magneto-optical disk or a semiconductor memory.

In a computer having the above-described structure, the CPU 1101 loads the programs stored in the storage unit 1108 to the RAM 1103 via the input/output interface 1105 and the bus 1104, and executes the programs so as to perform the above-described process.

The programs to be executed by the computer (the CPU 1101) may be recorded on the removable medium 1111 which is a package medium formed by for example a magnetic disk (including floppy disk), an optical disk (including compact disk-read only memory (CD-ROM), digital versatile disk (DVD) and the like), a magneto-optical disk or a semiconductor memory. Furthermore, the programs to be executed by the computer (the CPU 1101) may also be provided via a wired or wireless transmission medium such as local area network, Internet or digital satellite broadcasting.

The program may be installed in the storage unit 1108 via the input/output interface 1105 in a case that the removable medium 1111 is mounted in the drive 1110. In addition, the program may be received by the communication unit 1109 via the wired or wireless transmission medium, and is installed in the storage unit 1108. Alternatively, the program may be installed in advance in the ROM 1102 or the storage unit 1108.

The program to be executed by the computer may be executed according to the order described in the present disclosure, or may be executed in parallel or executed when necessary (such as when invoked).

The embodiments and technical effects of the present invention have been described in detail in conjunction with the accompanying drawings, but the scope of the present invention is not limited thereto. Those skilled in the art should understand that, various modifications and variations can be made on the embodiments discussed herein based on design requirements and other factors without departing from the principle and spirit of the present invention. The scope of the present invention is defined by the appended claims or the equivalents thereof.

Furthermore, the present invention may also be configured as follows.

A spectrum management device in a communication system, comprising one or more processors configured to: estimate a future moving trajectory of a communication device based on a location of the communication device and an environment where the communication device is located, wherein the communication device is an unpredictable mobile device; determine a trajectory radiation area to be interfered by the communication device as it moves along the future moving trajectory; and instruct the communication device or an interfered device in the trajectory radiation area which is subjected to co-frequency interference with the communication device to perform an operation for reducing interference.

Specifically, the operation for reducing interference includes at least one of using another spectrum and executing a signal processing method for reducing interference.

Specifically in a case where the interfered device accesses to the spectrum management device after the trajectory radiation area is determined, the one or more processors are configured to instruct the interfered device to use a spectrum which is allocated by the spectrum management device and different from that of the communication device.

Specifically, in a case where the interfered device has accessed to the spectrum management device when the trajectory radiation area is determined, the one or more processors are further configured to: determine whether or not the communication device is managed by the spectrum management device; determine presence or absence of allocable spectrum; and compare a priority level of the communication device with a priority level of the interfered device.

Specifically, in a case where the communication device is not managed by the spectrum management device and the allocable spectrum exists, the one or more processors are configured to instruct the interfered device to use a spectrum which is allocated by the spectrum management device and different from that of the communication device.

Specifically, in a case where the communication device is not managed by the spectrum management device and no allocable spectrum exists, the one or more processors are configured to instruct the interfered device to execute the signal processing method for reducing interference.

Specifically, in a case where the priority level of the communication device is higher than the priority level of the interfered device, the signal processing method is used for reducing interference to the communication device, which is induced by the interfered device; and in a case where the priority level of the communication device is lower than the priority level of the interfered device, the signal processing method is used for reducing interference to the interfered device, which is induced by the communication device.

Specifically, in a case where the communication device is managed by the spectrum management device and the allocable spectrum exists, the one or more processors are configured to instruct one of the communication device and the interfered device which has a lower priority level to use a spectrum which is allocated by the spectrum management device and different from that of the other one.

Specifically, in a case where the communication device is managed by the spectrum management device and no allocable spectrum exists, the one or more processors are configured to instruct one of the communication device and the interfered device which has a lower priority level to execute a signal processing method for reducing interference to the other one.

Specifically, the one or more processors are further configured to estimate the future moving trajectory based on a speed of the communication device.

Specifically, the one or more processors are configured to determine the trajectory radiation area based on a first distance representing an interference range of the communication device and a second distance over which the communication device is to move along the future moving trajectory.

Specifically, the one or more processors are further configured to determine the first distance based on transmission power of the communication device and a communication quantity index of the interfered device.

Specifically, the one or more processors are further configured to determine the second distance based on a speed of the communication device and a valid time of the trajectory radiation area.

Specifically, the one or more processors are further configured to: determine a monitoring time interval, where the interfered device periodically reports the location, a speed and transmission power of the communication device at the monitoring time interval notified by the spectrum management device; and determine, based on the report from the interfered device, whether or not to update the trajectory radiation area.

Specifically, the one or more processors are further configured to determine to update the trajectory radiation area in one of the following cases: a distance from the communication device to a boundary of the trajectory radiation area is less than or equal to a third distance, and a distance by which the location of the communication device deviates from the future moving trajectory is less than or equal to a fourth distance.

Specifically, in a case where a portion of the trajectory radiation area is managed by another spectrum management device, the one or more processors are configured to: perform control to notify the other spectrum management device of location information of the trajectory radiation area and the location, speed, transmission power and spectrum information of the communication device, such that the other spectrum management device instructs an interfered device located in the portion managed by it to perform an operation for reducing interference.

A method performed by a spectrum management device in a communication system, including: estimating a future moving trajectory of a communication device based on a location of the communication device and an environment where the communication device is located, where the communication device is an unpredictable mobile device; determining a trajectory radiation area to be interfered by the communication device as it moves along the future moving trajectory; and instructing the communication device or an interfered device in the trajectory radiation area which is subjected to co-frequency interference with the communication device to perform an operation for reducing interference.

Specifically, the operation for reducing interference includes at least one of using another spectrum and executing a signal processing method for reducing interference.

The method further includes: allocating to the interfered device a spectrum different from that of the communication device, in a case where the interfered device accesses to the spectrum management device after the trajectory radiation area is determined.

The method further includes: in a case where the interfered device has accessed to the spectrum management device when the trajectory radiation area is determined, determining whether or not the communication device is managed by the spectrum management device; determining presence or absence of allocable spectrum; and comparing a priority level of the communication device with a priority level of the interfered device.

The method further includes: based on a result of the determining, performing one of processes of: allocating, to the interfered device, a spectrum different from that of the communication device, and instructing the interfered device to execute a signal processing method for reducing interference.

The method further includes: based on a result of the determining, performing one of processes of: allocating, to one of the communication device and the interfered device which has a lower priority level, a spectrum different from that of the other one, and instructing one of the communication device and the interfered device which has a lower priority level to execute a signal processing method for reducing interference to the other one.

The method further includes: estimating the future moving trajectory based on a speed of the communication device.

The method further includes: determining the trajectory radiation area based on a first distance representing an interference range of the communication device and a second distance over which the communication device is to move along the future moving trajectory.

The method further includes: determining a monitoring time interval, and notifying the determined monitoring time interval to the interfered device; receiving the location, a speed and transmission power of the communication device which are periodically reported by the interfered device at the monitoring time interval; and determining, based on the report from the interfered device, whether or not to update the trajectory radiation area.

The method further includes: determining to update the trajectory radiation area in one of the following cases: a distance from the communication device to a boundary of the trajectory radiation area is less than or equal to a third distance, and a distance by which the location of the communication device deviates from the future moving trajectory is less than or equal to a fourth distance.

A communication system, comprising: an unpredictable moving communication device; one or more interfered devices subjected to co-frequency interference with the communication device, configured to report information regarding location, speed, transmission power and spectrum of the communication device to a spectrum management device; and the spectrum management device, configured to estimate a future moving trajectory of the communication device based on the location of the communication device and an environment where the communication device is located, determine a trajectory radiation area to be interfered by the communication device as it moves along the future moving trajectory, and for each of the interfered devices in the trajectory radiation area, instruct one of the interfered device and the communication device to perform an operation for reducing interference.

Specifically, the operation includes at least one of: using a spectrum different from that of the other one of the interfered device and the communication device, and executing a signal processing method for reducing interference.

Specifically, the interfered device is further configured to report periodically, such that the spectrum management device determines whether or not to update the trajectory radiation area based on the reported information.

The communication system further comprises another spectrum management device managing a portion of the trajectory radiation area, configured to: receive, from the spectrum management device, location information of the trajectory radiation area, and location, speed, transmission power and spectrum information of the communication device, and allocate another spectrum to an interfered device located in the portion managed by it, or instruct the interfered device to execute a signal processing method for reducing interference.

The invention claimed is:

1. A spectrum management device in a communication system, comprising one or more processors configured to:
   estimate a future moving trajectory of a communication device based on communication device's location and the location environment, wherein the communication device is an unpredictable mobile device;
   determine a trajectory radiation area to be interfered by the communication device as it moves along the future moving trajectory; and
   instruct an interfered device in the trajectory radiation area which is subjected to co-frequency interference with the communication device, to perform an operation for reducing interference;
   wherein, in a case where a portion of the trajectory radiation area is managed by another spectrum management device, the one or more processors are configured to:
   perform control to notify the other spectrum management device of location information of the trajectory radiation area and the location, speed, transmission power and spectrum information of the communication device, such that the other spectrum management device instructs the interfered device located in the portion managed by it to perform the operation for reducing interference.

2. The spectrum management device according to claim 1, wherein the operation for reducing interference comprises at least one of using another spectrum and executing a signal processing method for reducing interference.

3. The spectrum management device according to claim 1, wherein, in a case where the interfered device accesses to the spectrum management device after the trajectory radiation area is determined, the one or more processors are configured to instruct the interfered device to use a spectrum which is allocated by the spectrum management device and different from that of the communication device.

4. The spectrum management device according to claim 1, wherein, in a case where the interfered device has accessed to the spectrum management device when the trajectory radiation area is determined, the one or more processors are further configured to:
   determine whether or not the communication device is managed by the spectrum management device;
   determine presence or absence of allocable spectrum; and
   compare a priority level of the communication device with a priority level of the interfered device.

5. The spectrum management device according to claim 4, wherein, in a case where the communication device is not managed by the spectrum management device and the allocable spectrum exists, the one or more processors are configured to instruct the interfered device to use a spectrum which is allocated by the spectrum management device and different from that of the communication device.

6. The spectrum management device according to claim 4, wherein, in a case where the communication device is not managed by the spectrum management device and no allocable spectrum exists, the one or more processors are configured to instruct the interfered device to execute the signal processing method for reducing interference.

7. The spectrum management device according to claim 6, wherein,
   in a case where the priority level of the communication device is higher than the priority level of the interfered device, the signal processing method is used for reducing interference to the communication device, which is induced by the interfered device; and
   in a case where the priority level of the communication device is lower than the priority level of the interfered device, the signal processing method is used for reducing interference to the interfered device, which is induced by the communication device.

8. The spectrum management device according to claim 4, wherein, in a case where the communication device is managed by the spectrum management device and the allocable spectrum exists, the one or more processors are configured to instruct one of the communication device and the interfered device which has a lower priority level to use a spectrum which is allocated by the spectrum management device and different from that of the other one.

9. The spectrum management device according to claim 4, wherein, in a case where the communication device is managed by the spectrum management device and no allocable spectrum exists, the one or more processors are configured to instruct one of the communication device and the interfered device which has a lower priority level to execute a signal processing method for reducing interference to the other one.

10. The spectrum management device according to claim 1, wherein, the one or more processors are further configured to estimate the future moving trajectory based on a speed of the communication device.

11. The spectrum management device according to claim 1, wherein, the one or more processors are configured to determine the trajectory radiation area based on a first distance representing an interference range of the communication device and a second distance over which the communication device is to move along the future moving trajectory.

12. The spectrum management device according to claim 11, wherein, the one or more processors are further configured to determine the first distance based on transmission power of the communication device and a communication quantity index of the interfered device.

13. The spectrum management device according to claim 11, wherein, the one or more processors are further configured to determine the second distance based on a speed of the communication device and a valid time of the trajectory radiation area.

14. The spectrum management device according to claim 1, wherein, the one or more processors are further configured to:

determine a monitoring time interval, wherein the interfered device periodically reports the location, a speed and transmission power of the communication device at the monitoring time interval notified by the spectrum management device; and determine, based on the report from the interfered device, whether or not to update the trajectory radiation area.

15. The spectrum management device according to claim 14, wherein, the one or more processors are further configured to determine to update the trajectory radiation area in one of the following cases:

a distance from the communication device to a boundary of the trajectory radiation area is less than or equal to a third distance, and a distance by which the location of the communication device deviates from the future moving trajectory is less than or equal to a fourth distance.

16. A communication system, comprising:
an unpredictable moving communication device;
one or more interfered devices subjected to co-frequency interference with the communication device, configured to report information regarding location, speed, transmission power and spectrum of the communication device to a spectrum management device; and
the spectrum management device including circuitry configured to:
estimate a future moving trajectory of the communication device based on the location of the communication device and an environment where the communication device is located;
determine a trajectory radiation area to be interfered by the communication device as moves along the future moving trajectory; and
for each of the interfered devices in the trajectory radiation area, instruct the interfered device to perform an operation for reducing interference;
further comprising another spectrum management device including circuitry to manage a portion of the trajectory radiation area, and the circuitry configured to:
receive, from the spectrum management device, location information of the trajectory radiation area, and location, speed, transmission power and spectrum information of the communication device, such that the other spectrum management device instructs the interfered device located in the portion managed by it to perform the operation for reducing interference.

17. The communication system according to claim 16, wherein, the operation for reducing interference comprises:
using a spectrum different from that of the communication device.

18. The communication system according to claim 16, wherein, the interfered device includes circuitry configured to report periodically, such that the spectrum management device determines whether or not to update the trajectory radiation area based on the reported information.

19. The communication system according to claim 16 wherein the other spectrum management device includes circuitry configured to instruct the interfered device to execute a signal processing method for reducing interference.

20. A communication device comprising:
circuitry configured to:
communicate with a spectrum management device;
wherein the spectrum management device received, from another spectrum management device, information regarding location, speed, transmission power and spectrum of another communication device;
wherein the other communication device has an estimated future moving trajectory with a determined trajectory radiation area to interfere with the communication device as the other device is expected to move along the future moving trajectory;
wherein a portion of the determined trajectory radiation area is managed by the other spectrum management device;
the circuitry further configured to:
receive, from the spectrum management device, instruction to perform an interference reducing operation.

* * * * *